United States Patent
Dayan et al.

(10) Patent No.: US 8,510,295 B1
(45) Date of Patent: Aug. 13, 2013

(54) MANAGING RESOURCE STORAGE FOR MULTI RESOLUTION IMAGERY DATA WITH ZOOM LEVEL

(75) Inventors: Tal Dayan, Los Gatos, CA (US); Zhonghao Yang, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/427,437

(22) Filed: Mar. 22, 2012

Related U.S. Application Data

(62) Division of application No. 12/371,378, filed on Feb. 13, 2009, now abandoned.

(51) Int. Cl.
*G06F 17/30* (2006.01)
*G06F 7/00* (2006.01)

(52) U.S. Cl.
USPC .......................................... 707/723; 707/652

(58) Field of Classification Search
USPC ................................. 707/723, 652
See application file for complete search history.

(56) References Cited

U.S. PATENT DOCUMENTS

| | | | |
|---|---|---|---|
| 5,715,073 A * | 2/1998 | Miller | 358/534 |
| 7,801,888 B2 | 9/2010 | Rao et al. | |
| 7,966,638 B2 | 6/2011 | Gossweiler et al. | |
| 2005/0004903 A1 | 1/2005 | Tsuda | |
| 2006/0039581 A1* | 2/2006 | Decker et al. | 382/100 |
| 2007/0223871 A1 | 9/2007 | Thelen | |
| 2008/0181516 A1 | 7/2008 | Jackson | |
| 2010/0091053 A1* | 4/2010 | Jackson et al. | 347/9 |

OTHER PUBLICATIONS

Cignoni, Ganovelli, et al., "*Adaptive TetraPuzzles: Efficient Out-of-Core Construction and Visualization of Giganti Multiresolution Polygonal Models*," ACM Transactions on Graphics, vol. 23, Issue 3, Aug. 2004, 8 pages.

* cited by examiner

*Primary Examiner* — Kuen Lu
(74) *Attorney, Agent, or Firm* — Sterne, Kessler, Goldstein & Fox, P.L.L.C.

(57) ABSTRACT

Embodiments for managing resource storage for data objects are provided. In one embodiment, an aggregated user happiness (AUH) contribution for a data object is calculated by evaluating the metadata associated with the data object based on one or more AUH criteria. One or more resource storage parameters for the data object are determined based on the AUH contribution. The data object is replicated and stored on data servers based on the resource storage parameters.

3 Claims, 12 Drawing Sheets

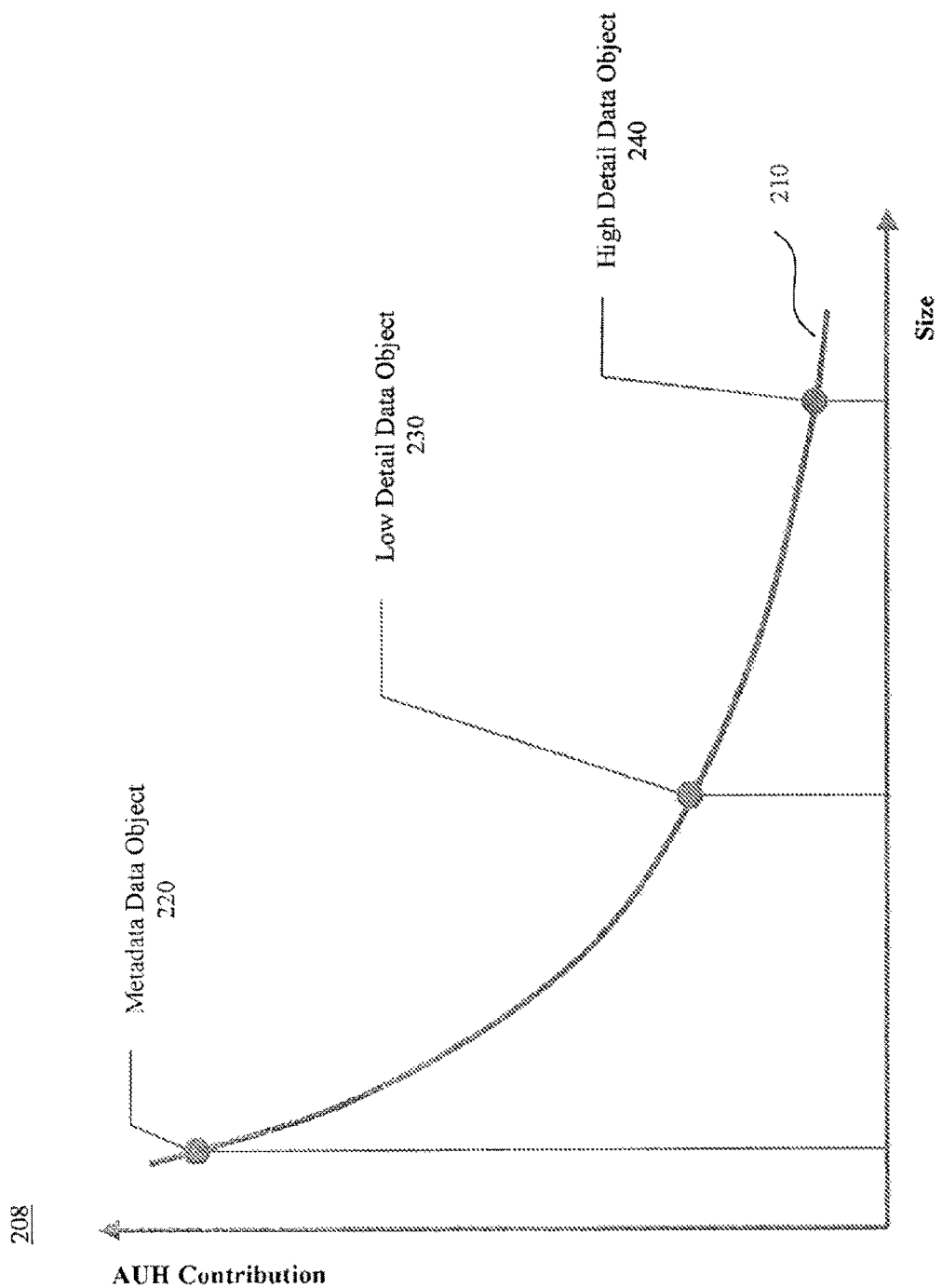

|  | FIG. 8A (3.5MP) | FIG. 8B (70MP) |
|---|---|---|
| DC Replication | 1.6 | 1.15 |
| GFS Replication | 1.5 | 1.5 |
| Overall Replication | ~2.4 | ~1.73 |
| Basic Coverage DC Redundancy | 3 | 3 |

FIG. 10

MANAGING RESOURCE STORAGE FOR MULTI RESOLUTION IMAGERY DATA WITH ZOOM LEVEL

CROSS REFERENCE TO RELATED APPLICATIONS

This patent application is a divisional of U.S. Non-Provisional patent application Ser. No. 12/371,378 filed on Feb. 13, 2009, entitled "Managing Storage Capacity of Multiresolutional Data Servers," which is incorporated by reference herein in its entirety.

FIELD OF THE INVENTION

The present invention relates to data storage management.

BACKGROUND ART

Data service providers offer data access to users through networks. Many applications are increasingly using multi-resolutional data. Multiresolutional data often includes image data represented at different levels of detail. Metadata may also be included depending upon a particular application. Such image data can include, but is not limited to, geographic information data (e.g. data representing imagery, map, terrain), and image data (such as photos captured or compressed at different resolutions). Such multiresolutional data can increase storage costs for data service providers because of the different levels of detail involved. Many applications using multiresolutional data may demand reliable services even for a large number of users over a large geographical area.

For example, Google Inc. provides street-level imagery of roads and streets worldwide to Internet users. The data may have multiple copies with different levels of detail. Each copy at a given level of detail may be further broken into one or more data objects, each of which contains a portion of the copy. To maintain a reliable data service, data is usually replicated over multiple data servers and data centers. For example, a data object may be replicated on several data servers in each data center that serves this service. A data object may have multiple copies even though it is rarely accessed and the information it provides may be useful only to a small number of users. The total size of multiresolutional data alone can be in the range of petabytes (PBs). When this multiresolutional data is replicated, this can require storage space in the range of high hundreds of PBs to exabytes (EBs). Such storage requirement is costly and makes increasing the scale of a data service very expensive. To decrease storage cost, some data service providers choose to have low levels of replication for all data objects. This may result in low user happiness however, because important data items are often unavailable or user access may be delayed.

BRIEF SUMMARY OF THE INVENTION

Embodiments of this invention relate to data storage management, and in particular to using selective replication of multiresolutional data objects that balances user happiness and resource cost.

In one embodiment, aggregated user happiness (AUH) is a measure of the aggregated happiness associated with users that use a data service to access data objects stored and managed by the data service. An AUH contribution for a data object is calculated by evaluating metadata associated with the data object based on one or more AUH criteria. One or more resource storage parameters for the data object are then determined based on the AUH contribution. The data object is then replicated and stored at one or more data centers based on the resource storage parameters.

In another embodiment in a geographic information system, an AUH contribution is calculated for a tile representing a portion of an image at a zoom level. The AUH contribution for the tile may be determined based on one or more criteria including the popularity of the tile, the point of interest in the tile, geographic information, user annotations, access patterns, advertisement information, and size. Based on the determine AUH contribution, resources may be allocated for the tile. The tile may then be replicated into copies. In one example, the copies of the tile are stored on a number of data servers at selected data centers using a determined compression algorithm. Tiles having higher AUH contributions may be allocated more resources than tiles having lower AUH contributions. Their availability to user access may be increased accordingly. In this way, the selective replication of the tiles may reduce overall resource cost for the system while maintaining a desired aggregated user happiness level.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left most digit in the corresponding reference number.

FIG. 2B is a chart illustrating a relationship between aggregated user happiness (AUH) contributions and size of data objects according to an embodiment of the present invention.

FIG. 10 is an exemplary table illustrating the replication results for multiresolutional panoramic image data in FIGS. 8A and 8B.

DETAILED DESCRIPTION OF EMBODIMENT(S)

Figure 1:
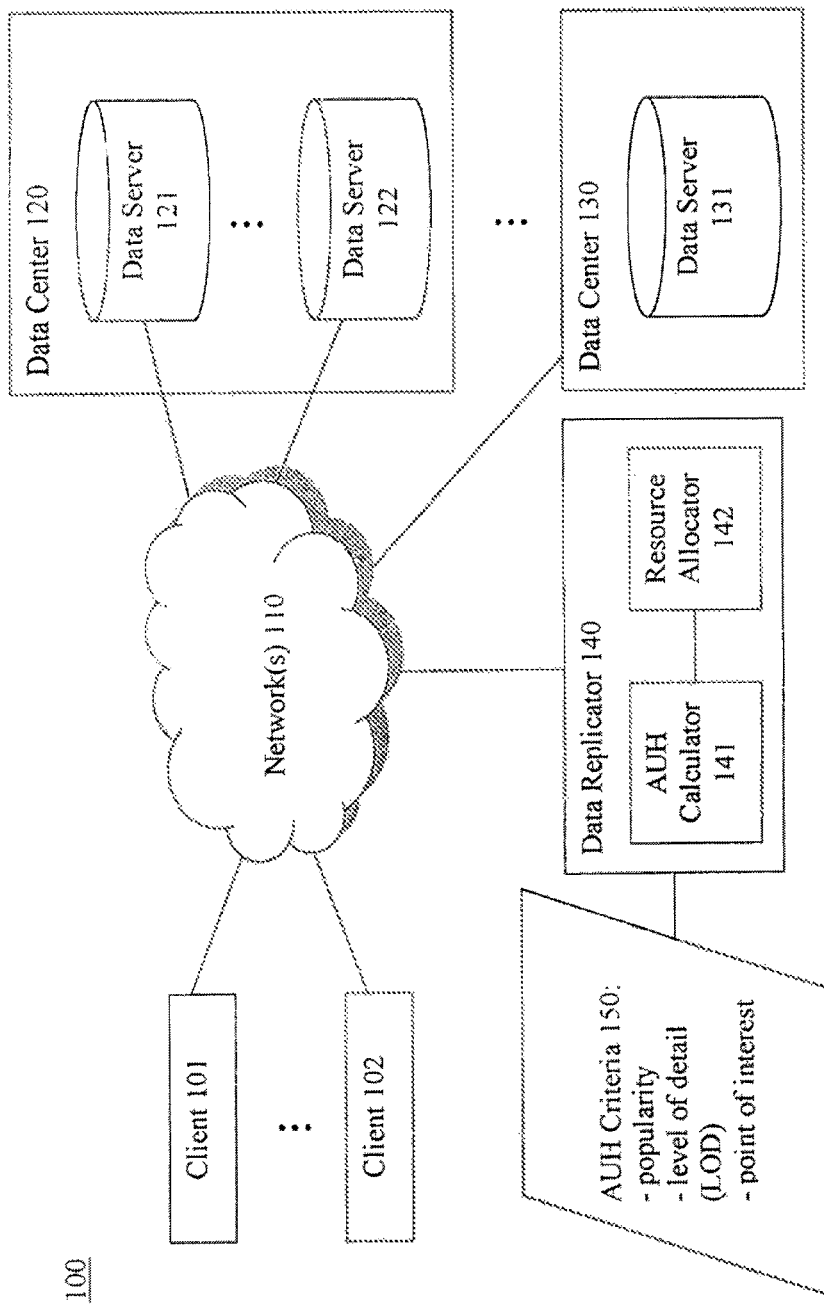
FIG. 1 is a diagram of a system for managing storage capacity using selective replication of data objects according to an embodiment of the present invention.

Embodiments of the present invention include methods and systems for managing storage resources by selective replication of data objects having multiresolutional data. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "data object" used herein refers to a unit of data to be replicated and stored. In one embodiment of the present invention, the data is multiresolutional data that has hierarchical structures representing different levels of detail. Each level of detail may be divided into several portions, and each portion may be manipulated independently as a data object. For example, in a data service provided by a geographic information system, users can access geographic imagery data with different zoom levels. The different levels of detail represented in the hierarchical structures are displayed at these different zoom levels. An image representing a location in one zoom level may be divided into one or more tiles. As a data object, each tile may be replicated and stored independently in the system.

The term "metadata" used herein refers to information about the data object. In one embodiment, the metadata for a data object may include all or part of available metadata associated with the data object. For example, the metadata for a data object used by a geographic information system may include a content description of the data object, the popularity, user access pattern, creation and update time stamps, associated geographic information, user annotations, etc. These examples are illustrative and are not intended to limit the definition.

The term "aggregated user happiness" (AUH) used herein is a measure of the aggregated happiness associated with users that use the data service at a given time. A user's happiness refers to his or her satisfaction with a use of the data service. High values of AUH indicate high levels of happiness, and low values indicate low levels of happiness. For example, high values of AUH may be obtained from providing high quality data services such as ability to access desired data, fast user access to desired data, low access error rate, and other factors pertinent to a better user experience. Conversely, relatively low AUH values can be obtained from providing low quality data services such as slow data access, frequent access errors, unable to access data, etc.

The AUH value for a data service is an aggregated value. For each data object in the data service, an individual user experience when accessing the data object contributes to an AUH contribution associated with the data object. Each data object therefore contributes to the AUH value for the data service. In one embodiment, in order to balance the cost of providing the data service and users' overall experience of such service, storage resources are allocated to data objects based on their AUH contributions. For each data object, its contribution to the AUH, or its AUH contribution, is determined based on the metadata associated with the data object. The AUH contribution reflects the importance of the data object to users. Accordingly, data objects with higher AUH contributions are assigned more resources to increase their availability while data objects with lower AUH contributions are assigned fewer resources to reduce their cost to the system. Data objects representing different levels of detail and portions for the same data content may have different AUH contributions. Therefore based on AUH contributions, different data objects, representing different aspects of the same data, may be replicated into different numbers of copies and be stored in different data centers.

System Overview

FIG. 1 is a diagram of system 100, according to one embodiment of the present invention. Such a system manages data storage resources based on one or more AUH criteria. System 100 includes one or more clients 101, 102, one or more data centers 120, 130, and a data replicator 140. In FIG. 1, one or more clients (such as, clients 101 and 102) may be coupled to one or more data centers (such as, data centers 120 and 130) through one or more networks (such as, network(s) 110). Clients 101 and 102 can access data objects stored at data centers 120 and 130 via network(s) 110. Data centers 120 and 130 have resources, such as, one or more data servers to manage and store the data. A data server may include one or more storage devices including but not limited to mass storage devices. As shown in FIG. 1, data center 120 may have two data servers 121 and 122; data center 130 may have a data server 131. Each of data servers 121, 122, and 131 may store one or more replicated copies of data objects. This example is illustrative and not intended to limit the present invention. Only two clients 101 and 102 are shown for clarity. In general, any number of clients may be used including, but not limited to, a large number of clients over a large geographic area. Likewise, only two data centers 120 and 130 are shown for clarity. In general, any number of data centers may be used including, but not limited to, a large number of data centers over a large geographic area. Only two data servers 121 and 122 are shown in data center 120, and only one data server 131 is shown in data center 130 for clarity. In general, a data center may have any number of data servers.

Network(s) 110 can be any network or combination of networks that can carry data communication. In addition, network(s) 110 may also contain sites that can be accessed for information retrieval. Such networks may include, but are not limited to, local area networks, medium area networks, and/or wide area networks, such as the Internet. They may support protocols and technology including, but not limited to, World Wide Web protocols and/or services. Intermediate web servers, gateways, or other servers may be provided between components of system 100 depending upon a particular application or environment.

Data Replicator

Data replicator 140 is coupled to the data centers 120 and 130 through network(s) 110. According to a feature, data replicator 140 calculates AUH contributions for data objects and allocates storage resources for the data objects based on their respective AUH contributions. Data replicator 140 replicates the data objects and stores the copies of the data objects at data centers 120 and 130.

In one embodiment, data replicator 140 includes an AUH calculator 141 and a resource allocator 142. AUH calculator 141 evaluates the metadata associated with a data object and calculates an AUH contribution for the data object based on one or more predetermined AUH criteria 150. Examples of AUH criteria include, but are not limited to, popularity of the data object, level of detail (LOD) of the content of the data object, point of interest contained in the data object, etc. In one embodiment, AUH criteria 150 can be stored in memory (not shown) and accessed or retrieved by AUH calculator 141. In another embodiment, AUH criteria 150 can be stored in a database (not shown) coupled to AUH calculator 141.

Resource allocator 142 allocates resources for a data object based on its AUH contribution. In one embodiment, resource allocator 142 determines one or more resource storage parameters for the data object. The resource storage parameters may include, but are not limited to, the number of copies to be replicated for the data object, which data centers and/or which data servers to store the copies of the data object, the compression algorithm for the replication, etc. Resources may then be allocated for the data objects accordingly. The data objects may be replicated and stored on the allocated resources based on the resource storage parameters. Data replication based on such resource storage parameters may reduce overall resource cost without sacrificing the availability of data objects with high AUH contributions.

Each of those system components, such as data replicator 140, and its components AUH calculator 141 and resource allocator 142, may include any computing device that can communicate over a network. Examples of computing devices include, but are not limited to, a computer, workstation, distributed computing system, computer cluster, embedded system, stand-alone electronic device, networked device, mobile device (e.g. mobile phone or mobile computing device), rack server, set-top box, or other type of computer system having at least one processor and memory.

In one example, data replicator 140 and data centers 120 and 130 operate on different remote computing devices and communicate with one another over network(s) 110. In another example, data replicator 140 and data center 120 may be combined on one device or coupled locally to one another. In another example, data replicator 140 and data center 130 may be combined on one device or coupled locally to one another. Alternatively, data replicator 140 and data centers 120 and 130 may be connected together locally. Data centers 120 and 130, data replicator 140, AUH calculator 141 and resource allocator 142 can each be implemented in software, firmware, hardware, or any combination thereof on one or more computing devices.

Figure 2A:
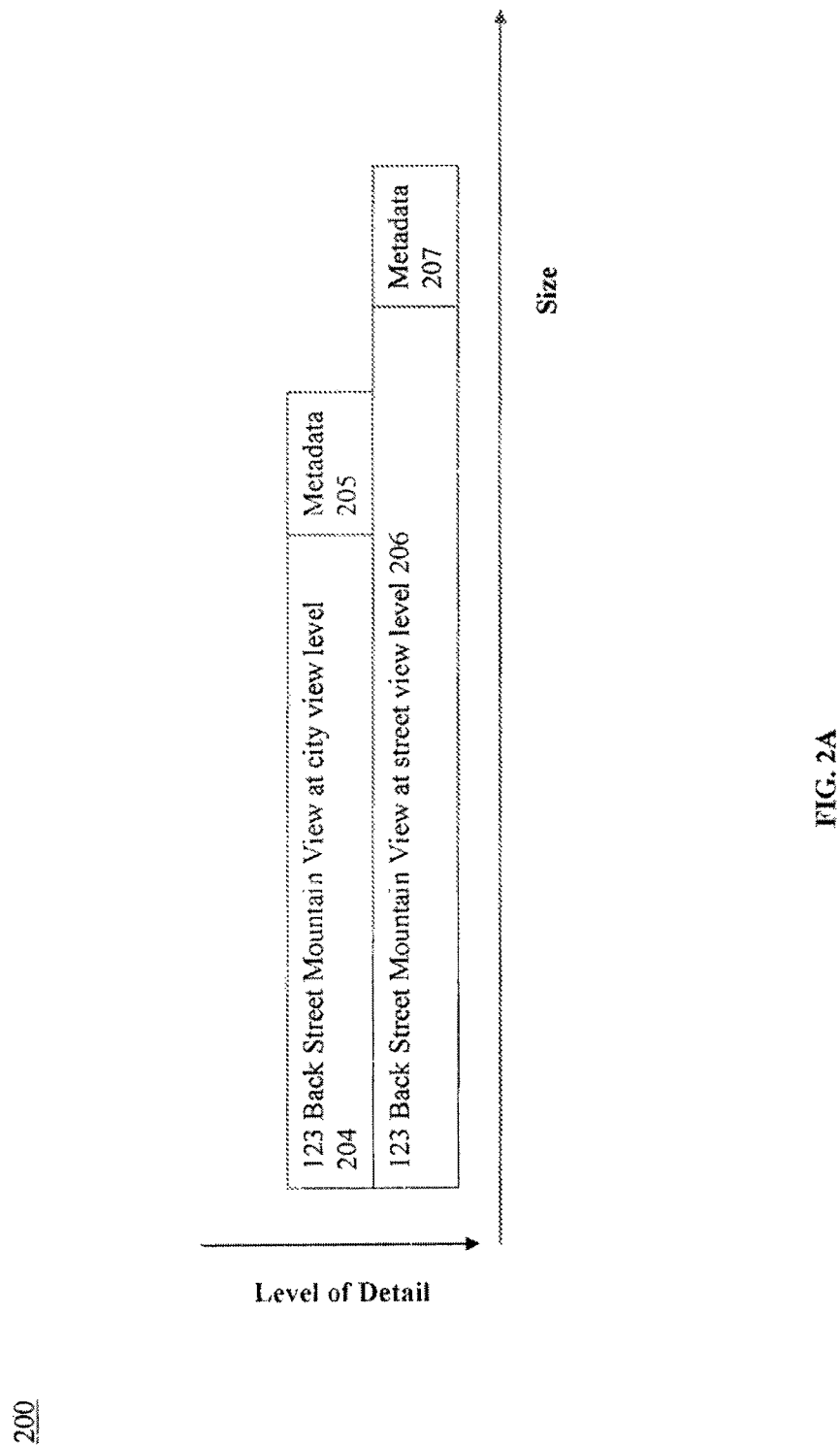
FIG. 2A is a diagram illustrating level of detail and size for a hierarchical structure of multiresolutional data according to an embodiment of the present invention.
Figure 3:
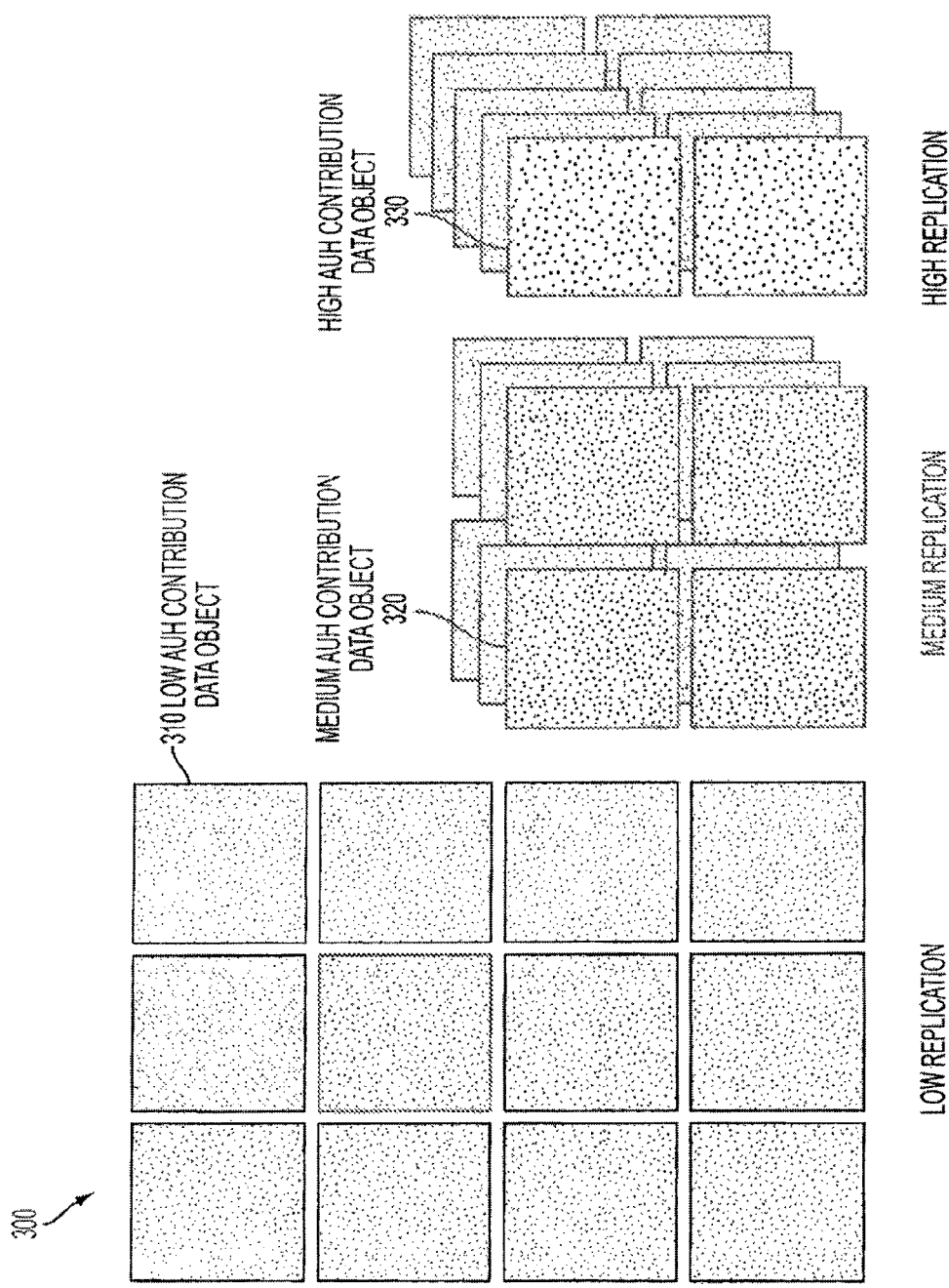
FIG. 3 is an illustrative diagram for a replication strategy based on AUH contributions of data objects according to an embodiment of the present invention.
Figure 4:
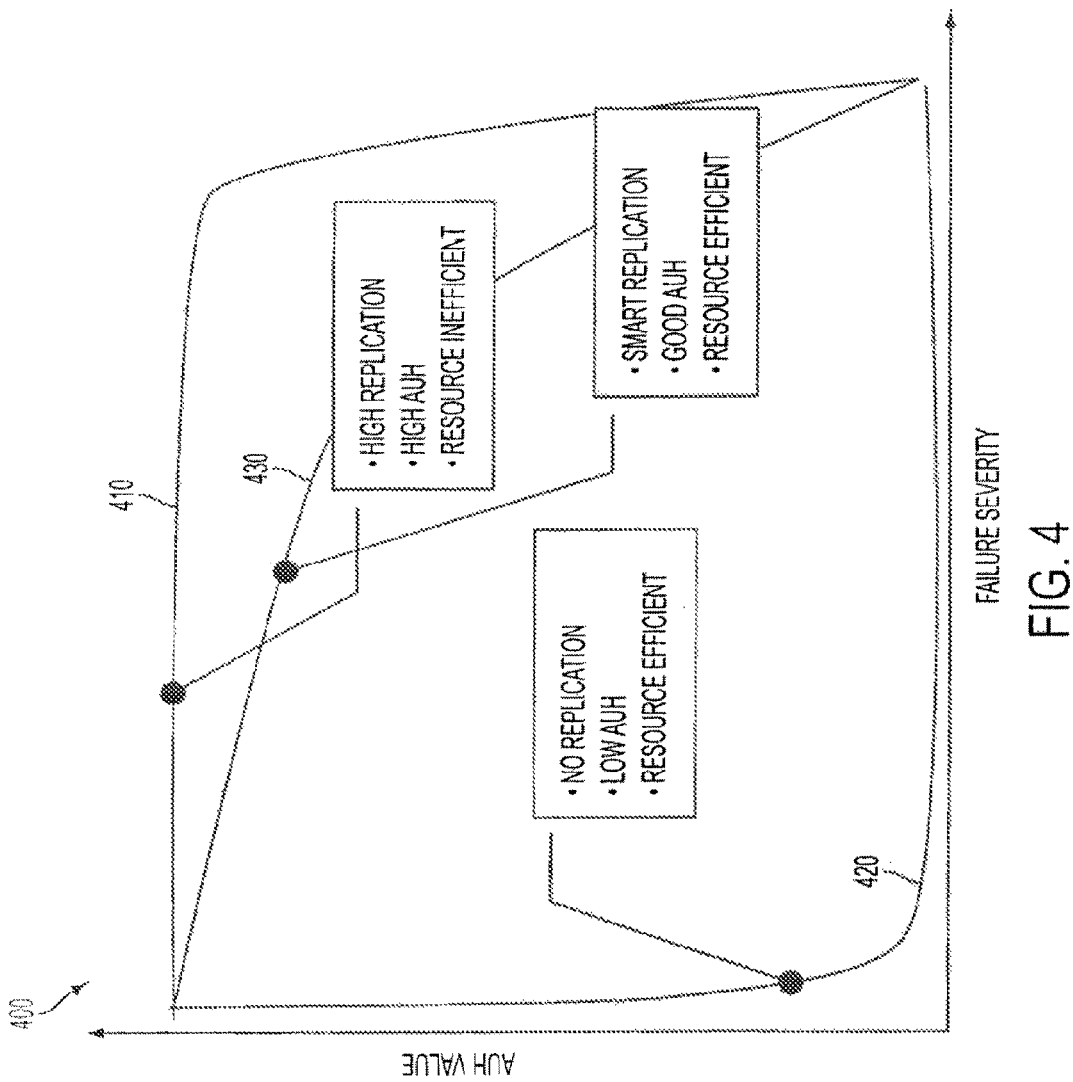
FIG. 4 is a chart illustrating a relationship between Aggregated User Happiness (AUH) and data request failure severity for different replication strategies according to an embodiment of the present invention.
Figure 5:
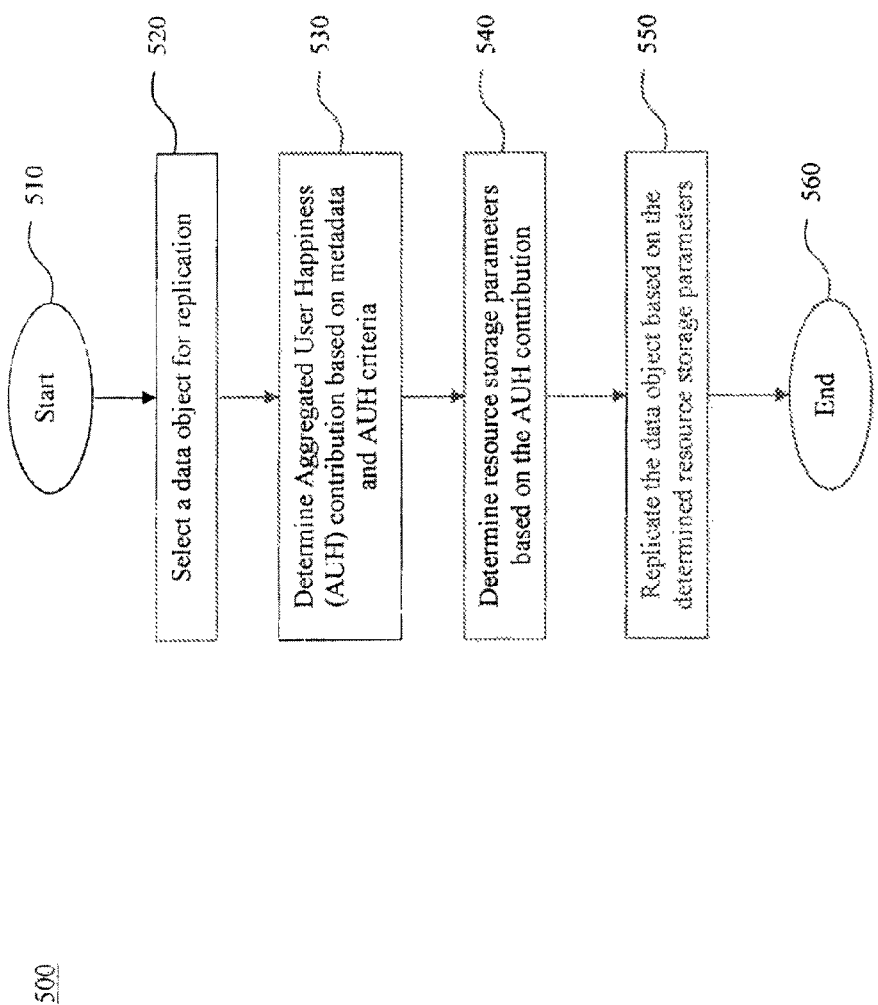
FIG. 5 is a flow chart diagram of an exemplary routine of selective replication of a data object based on its AUH contribution according to an embodiment of the present invention.
Figure 6:
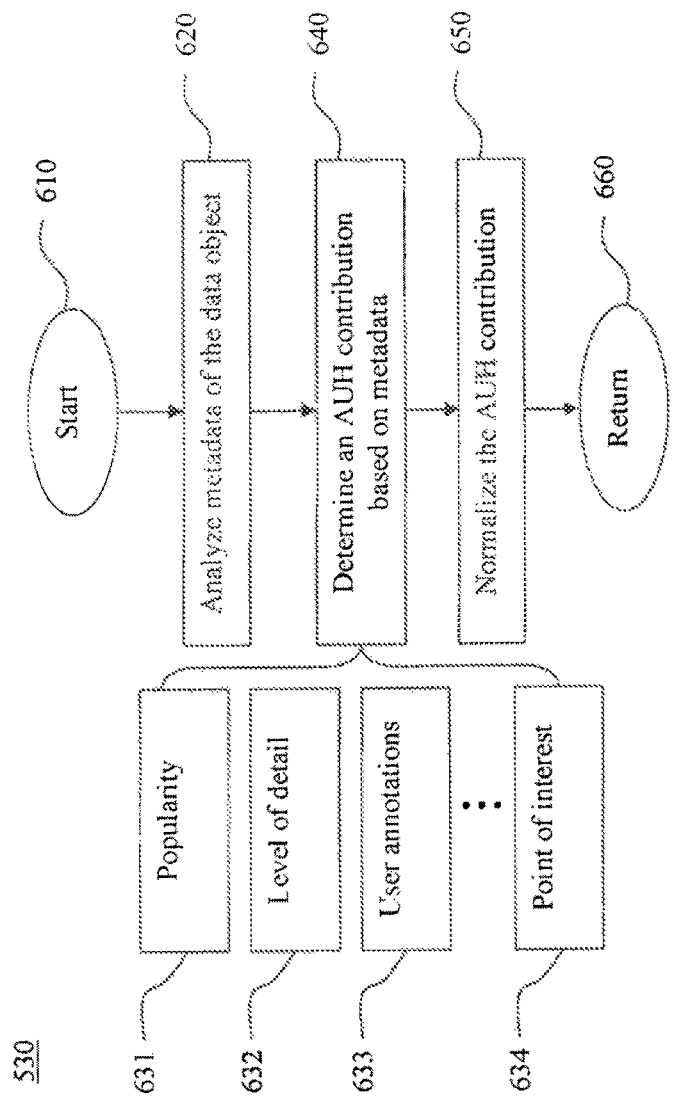
FIG. 6 is a flow chart diagram of an exemplary routine of calculating an AUH contribution for a data object based on metadata according to an embodiment of the present invention.
Figure 7:
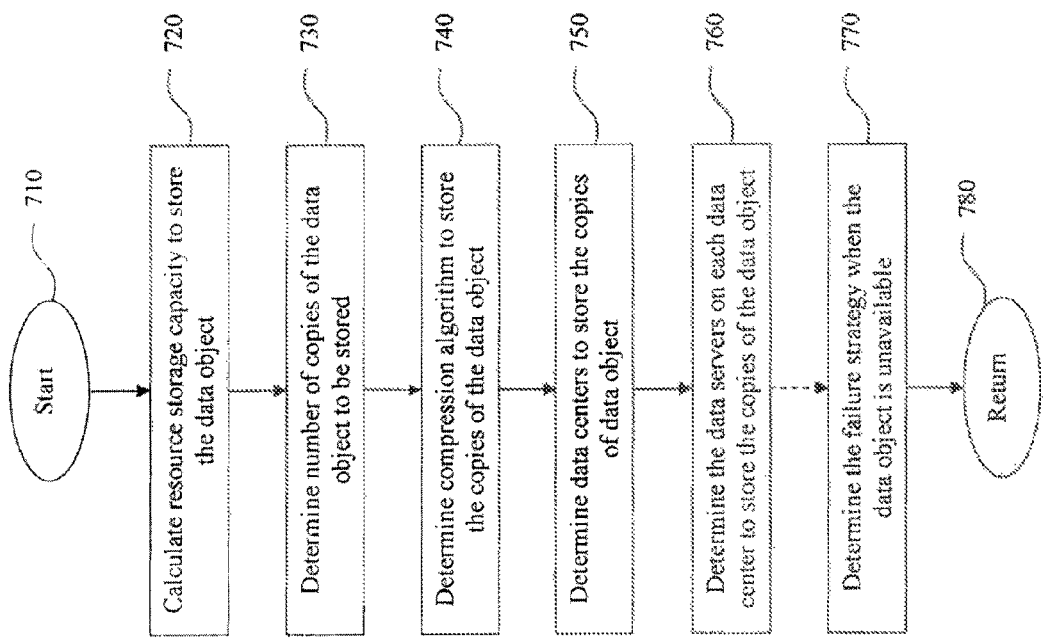
FIG. 7 is a flow chart diagram of an exemplary routine of determining resource storage parameters for a data object based on the AUH contribution according to an embodiment of the present invention.

Embodiments and their operation are further described with respect to diagrams shown in FIGS. 2-4 and routines 500, 530, and 540 in FIGS. 5, 6 and 7. Routines 500, 530 and 540 will be described with reference to system 100 in FIG. 1 but are not necessarily limited to system 100.

Storage Management Based on Aggregated User Happiness

FIG. 5 shows a flow chart diagram of an exemplary routine 500 for selectively replicating a data object based on its AUH contribution according to one embodiment of the invention (steps 510-560).

A data replicator starts to replicate data objects at step 510. In one embodiment of the invention, the data replicator may be data replicator 140 of system 100 in FIG. 1. In step 520, a data object is selected for replication.

In step 530, AUH calculator 141 calculates an AUH contribution for the data object based on one or more AUH criteria, such as AUH criteria 150, and metadata associated with the respective data object. The metadata may include content information, level of detail, when the data object was created and updated, creator and/or owner information, etc. For example, the metadata associated with an image tile in a geographic information system (GIS) may have location information of the tile, points of interest in the tile, geographic information, zoom level, view direction, popularity of the location represented by the tile, access pattern, advertisement information, user annotations about the tile, etc. All or part of such metadata may be considered when calculating the AUH contribution for the data object.

Step 530 is illustrated in further detail in a flow chart in FIG. 6 according to one embodiment of the invention.

AUH Calculation

FIG. 6 shows a flow chart diagram of an exemplary routine for calculating the AUH contribution performed in step 530 according to one embodiment of the invention.

AUH calculator 141 starts to calculate the AUH contribution for the data object at step 610. In step 620, AUH calculator 141 analyzes the metadata based on one or more AUH criteria 150.

In one embodiment, in step 640, AUH calculator 141 determines the AUH contribution for the data object based on the analysis result from step 620. The analysis result may include, but are not limited to, popularity 631, level of detail 632, user annotations 633, and point of interest 634.

AUH calculator 141 may use the popularity of the data object 631 as a parameter to determine the AUH contribution. Because popular data objects may be frequently accessed by users, they may have high contributions to the overall AUH value for the data service. Therefore such data objects may have high determined AUH contributions. For example, in a geographic information system, the data objects of 222 Residential Lane, Mountain View, Calif., may have a lower AUH contribution than those showing "La Costena Custom Burritos" in Mountain View, Calif., due to the popularity of this eatery.

AUH calculator 141 may also consider the level of detail of the data object 632 as a parameter in assessing the AUH contribution. In one embodiment, the level of detail may be related to the resolution of the data object. Data objects in high resolutions often provide more details than data objects in lower resolutions. For example, a regular sized image captured by a digital camera contains more details than the respective compressed thumbnail image. The resolution information may be obtained from the metadata associated with the data object. Alternatively, the resolution information can be calculated based on the size information of the data object. In another embodiment, the level of detail may be related to the zoom level in the metadata associated with a tile in a GIS.

FIG. 2A is a diagram illustrating a hierarchical structure 200 for multiresolutional data. In FIG. 2A, data for include a data object at city view level 204, and a data object at street view level 206. FIG. 2A also includes metadata objects 205 and 207 that describe each data objects 204 and 206 at their particular levels of detail respectively. Data object 206 is at street view level for "123 Back Street Mountain View" and has a larger size and a higher level of detail. Data object 204 is at city view level and has a medium size and a lower level of detail.

FIG. 2B shows an illustration chart 208 of the relationship between the AUH contribution, storage size, and level of detail of data objects. Data objects representing metadata such as metadata object 220 may be accessed most frequently but they often have smallest storage size with no level of detail. Often, users may be only interested in data objects with low or medium level of detail and with medium resource storage requirements such as low detail data object 230. Data objects with higher levels of detail such as high detail data object 210 may be less accessed and require larger sizes of resource storage. Therefore, a data object may contribute to the overall AUH value based on its level of detail. In one embodiment, a metadata object may have a high determined AUH contribution, a medium detailed data object may have a medium determined AUH contribution, and a high detailed data object may have a low determined AUH contribution. For example, in an exemplary embodiment in a geographic information system, a tile of a most inner zoom level of 123 Back Street Mountain View Calif. has lower determined AUH contribution than a tile in the normal zoom level at that location since the probability of a user zooming in to that tile is lower than the probability of the user looking at a medium level view of that location.

AUH calculator 141 may also consider the point of interest represented by the data object 633 in determining the AUH contribution. For example, in a GIS, tiles of 123 Back Street, Mountain View, Calif. may have lower AUH contributions than those tiles for more popular places, such as, San Francisco's Golden Gate Bridge or Eiffel Tower, Par's, France.

If the metadata contains user annotations such as user annotations 634, AUH calculator 141 may also consider user annotations 634 as a parameter to determine the AUH contribution for the data object. For example, if a user annotated a data object with text, markers, lines, etc., its AUH contribution may be higher. For example, in an embodiment in a GIS, if a user annotates a tile with a rectangle and the text "Best McDonald in town!", the tile may have a high AUH contribution.

Other AUH criteria based on metadata can also be used to determine the AUH contribution by AUH calculator 141. For example, tile content can also be considered. Image tiles representing business districts may have higher contributions than those representing residential areas. In addition, a tile with no interesting details but only blue sky may have a lower AUH contribution than a tile containing data related to a restaurant's opening hours. Tiles related to paid advertisements or geographical importance such as intersections may have high AUH contributions. AUH contributions may also be related to special events. For example, tiles of New Orleans taken just after hurricane Katrina may have high AUH contributions for a certain time period because of their special interest to the public. AUH contributions can be determined based in part on when the data object was created and/or updated. For example, a data object that has been updated recently may have a higher AUH contribution than a data object last updated two years ago. AUH contributions of data objects containing data on behalf of paying customers may also be determined to be higher. If one or more data objects related to a user have high AUH contributions, AUH calculator 141 may assign high AUH contributions to all other data objects related to that user. In another embodiment in an image service system, the user's viewing window can be tracked and a high AUH contribution can be determined for a data object at the center of the view window. These examples are illustrative and are not intended to limit the invention.

The determining of the AUH contribution for the data object can be done in different ways. In one embodiment, the AUH contribution can be calculated using a weighted function. Weights are assigned to different AUH criteria and the AUH contribution is calculated based on those weights. Different criteria can be weighted differently depending upon applications. For example, in a geographic information system, points of interest may be assigned higher weight than level of detail. In another embodiment, the AUH contribution can be calculated using implicit system behavior. For example, more frequently accessed data objects may have higher AUH contributions than objects seldom accessed. In an alternative embodiment, AUH contributions are calculated based on object types. For example, there may be metadata data objects and image data objects in an image service application. Metadata data objects may have higher AUH contributions than image data objects.

Besides the AUH criteria, the AUH contribution may also be calculated based on user input. For example, the users may direct the system to increase or decrease AUH contributions of data objects. The users can be general users or system administrators.

Because the size of the data object is another factor to be considered for resource allocation, AUH calculator 141 may normalize the calculated contribution based on the size of the data object in step 650. A large object with the same AUH contribution as a smaller object will have a lower normalized AUH contribution to capture the fact that it consumes more disk space than a smaller object that provides the same AUH contribution to the users. In another embodiment, the AUH contribution may not be normalized. AUH calculator 141 returns to routine 500 in step 660.

Determining Resource Storage Parameters

Returning to routine 500 in FIG. 5, after AUH calculator 141 calculates the AUH contribution of the data object in step 530, resource allocator 142 determines resource storage parameters for the data object based on the calculated AUH contribution in step 540. An exemplary routine of step 540 is illustrated in further detail in FIG. 7.

In step 710, resource allocator 142 receives the AUH contribution and starts to determine resource storage parameters for the data object. In step 720, resource allocator 142 calculates a resource storage capacity to store the data object based on the AUH contribution and the system resource status.

Resource allocator 142 also determines one or more other resource storage parameters to replicate and store the data object. In one embodiment, the resource storage parameters may include, but are not limited to, storage size allocated to the data object, number of replication copies, compression rate and algorithms, data centers and data servers where copies of the data object to be stored, failure strategies if the data object is unavailable, etc. These examples are illustrative and not intended to limit the present invention.

In step 730, resource allocator 142 determines how many copies of the data object to store in the system based on the AUH contribution. Data objects with higher AUH contributions may be replicated into more copies. FIG. 3 illustrates the relation between AUH contributions and replication levels according to one embodiment of the present invention. Data object 310 with a low AUH contribution receives low replication, data object 320 with a medium AUH contribution receives medium replication, and data object 330 with a high AUH contribution receives high replication. These examples are illustrative and are not intended to limit the invention.

In step 740, resource allocator 142 determines the replication method such as the compression algorithm to be used to replicate the data object. In one embodiment, data objects with low AUH contributions are replicated and stored in a compact format using error correction code such as a Reed-Solomon code that requires longer time to recover from disk errors, while objects with higher AUH contributions are stored using full replication.

In step 750, resource allocator 142 may determine number and locations of data centers to store the copies of the data object. In an embodiment, data objects with higher AUH contributions are replicated in all data centers (such as data centers 120, 130) in the system while data objects with lower AUH contributions are stored only in a few or even just one data center. Resource allocator 142 may also determine in which data centers to store the data objects. In an exemplary embodiment, data objects with high AUH contributions may be stored at data centers with high quality of services offering fast access speed and low disk error rate. In another embodiment for a geographic information system, images with low AUH contributions may be stored only at data centers close to the locations they represent because they are probably most often accessed by local users.

Reducing the resource allocated to data objects with low AUH contributions may result in data object unavailability in certain circumstances. FIG. 4 shows an illustrative chart of the relationship between AUH and service failures. Curve 410 shows high data object replication, has high AUH, but is resource inefficient. Curve 420 shows no data object replication, has low AUH, but is resource efficient. Curve 430 shows smart or selective replication, has good AUH, and is also resource efficient. This is because by selectively replicating data objects based on their AUH contributions can maintain a good overall AUH level while efficiently making use of available resources.

Resource allocator 142 also determines access failure strategies when a data object is unavailable in step 770. Different access failure strategies will result in different system behavior in system 100 when a data object is unavailable. In one embodiment, the data object can be reconstructed from its available source data. In another embodiment, unavailable data can be partially reconstructed from other data objects that are available. For example, a high resolution data object can be constructed by oversampling lower resolution data objects and a low resolution data object can be constructed by downsampling. In another embodiment, system 100 may handle data unavailability by limiting user access options, e.g., limiting zoom level or skipping over images that are not available in an image service. In yet another embodiment, system 100 may provide alternative data objects, e.g. blue data objects for top viewing data objects in a GIS. In an alternative embodiment, system 100 may send a friendly message to the user such as "this data object is currently unavailable, please try again later." These examples are illustrative and are not intended to limit the present invention.

In step 780, routine 540 returns to routine 500 with determined resource storage parameters. In step 550, data replicator 140 replicates the data object and stores the copies of the data object at data centers based on the resource storage parameters.

In some embodiments, the AUH contribution and replication of a data object may be dynamically changed from time to time based on access patterns and other information. In other embodiments, the AUH contribution of a data object is static and its replication level does not change after it is created. In another embodiment, users and/or administrators can also adjust the AUH contributions manually. In one embodiment, data replicator 140 can automatically track the access patterns of data and change dynamically the resources allocated to a data object so that data objects with higher AUH contributions get more resources. In another embodiment, the readjustment of resources allocated to a data object is done off line by a batch process. In some embodiments, the allocation of resources to data objects may consider other information, in addition to the AUH contribution, such as the data centers or geographical locations from which the object was requested, business and phone directories or access patterns, advertisement considerations, public event information, news, real estate directories, and information from related services, etc. These examples are illustrative and are not intended to limit the present invention.

In some embodiments, minimal and maximal resource allocation can be imposed on data objects. For example, all data objects can be constrained to a replication level of at least one, data objects of up to a certain level of detail can be constrained to have a replication level of at least three, or all data objects can be constrained to have replication level four at most.

When the AUH contributions of data objects are determined, resources are allocated to them. Generally speaking, data objects with high AUH contributions may receive more resources, and data objects with lower AUH contributions may receive fewer resources. This relationship of AUH contributions to resource allocation may be implementation specific however. In different embodiments, the relationship may vary.

EXAMPLE

In one exemplary embodiment, multiresolutional panoramic images are replicated based on AUH contributions of image tiles.

Figure 8B:
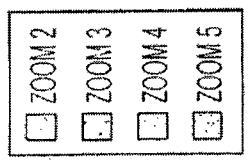
FIGS. 8A and 8B are exemplary data size distribution charts for multiresolutional panoramic image data at different zoom levels according to one embodiment of the present invention.
Figure 8B:
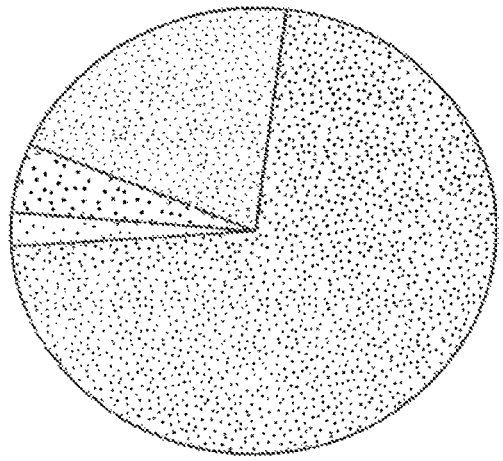
Figure 8A:
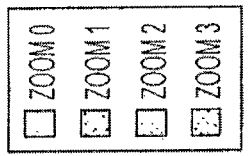
Figure 8A:
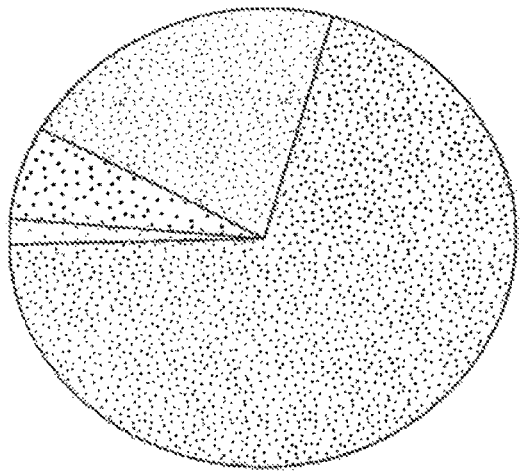

FIG. 8A shows a data size distribution chart for one exemplary set of multiresolutional panoramic image data. In FIG. 8A, the data has four zoom levels from 0 to 3. Data at higher zoom level has higher resolution but larger data size. For example, the data at zoom level 0 has the lowest resolution but the smallest data size. The data at zoom level 3 has the highest resolution but the largest data size. The total data size in FIG. 8A is 3.5 mega pixels (MP).

FIG. 8B shows a data size distribution chart for one exemplary set of multiresolutional panoramic image data. The highest zoom level in FIG. 8B is 5. The lowest zoom level visible in FIG. 8B is 2. The zoom levels 0 and 1 are negligible in FIG. 8B. Similar to FIG. 8A, higher zoom levels have higher data resolutions but larger data sizes. The total data size in FIG. 8B is 70 MP. As shown in FIG. 8B, the data at zoom level 5 contributes to almost three quarters of the total data size.

Figure 9:
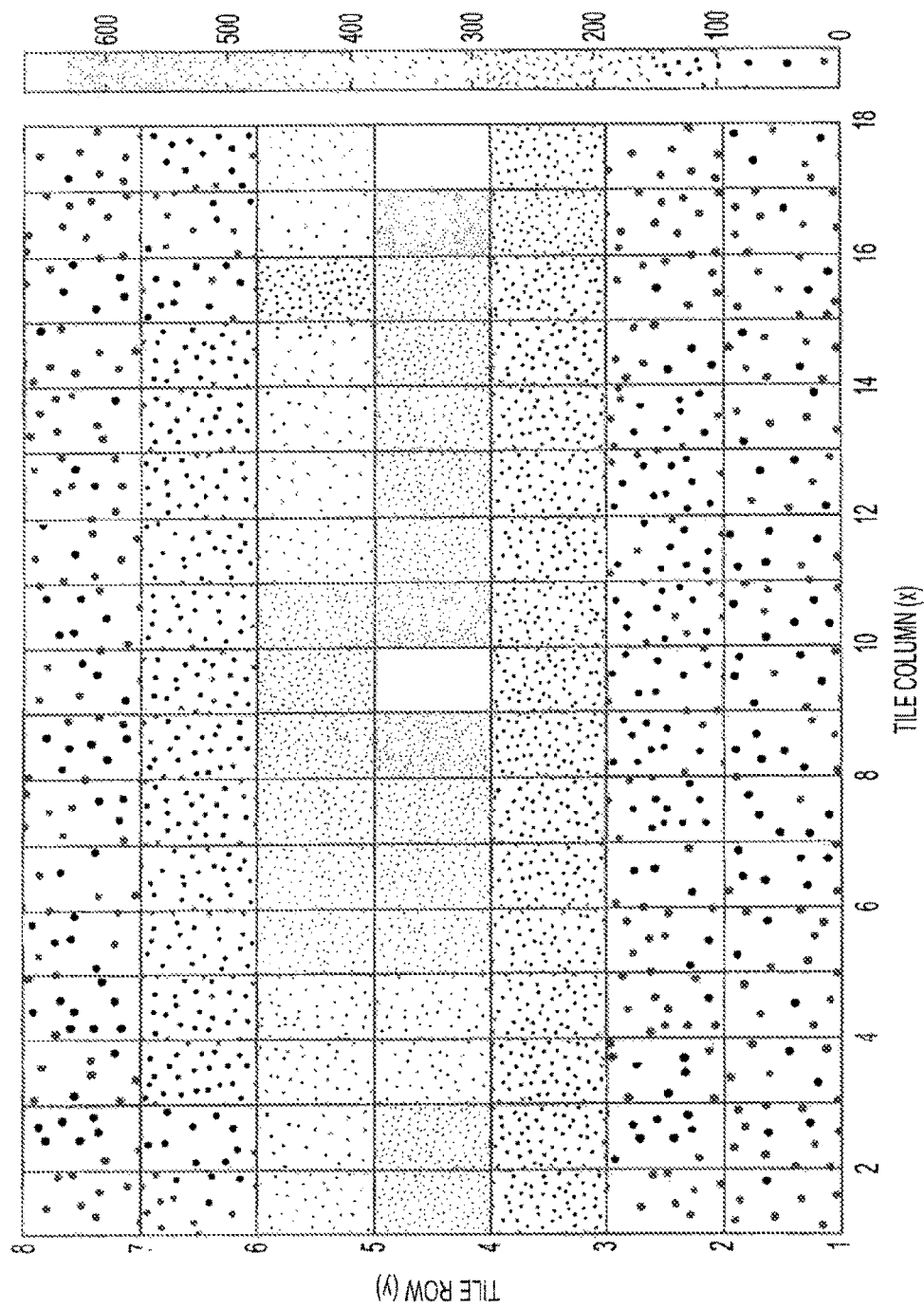
FIG. 9 is an exemplary request distribution chart according to panoramic image tile locations at one zoom level according to one embodiment of the present invention.

FIG. 9 shows an exemplary tile request pattern according to tile locations in a panoramic image according to one embodiment of the present invention. In FIG. 9, the tiles are at zoom level 5. In FIG. 9, darker colors represent fewer requests while brighter colors correspond to more requests. As shown in FIG. 9, the tiles near the middle row of the panoramic image have more access than the tiles near the horizontal edges. Some tiles such as the tile at column 10 and row 1 have no request at all.

AUH contributions of the images tiles are evaluated. Replicating tiles according to their AUH contributions can reduce storage sizes but maintain reasonable user aggregated experiences.

FIG. 10 shows AUH-based replication results for multi-resolutional panoramic image data in FIGS. 8A and 8B according to one embodiment of the present invention. In FIG. 10, DC (data center) replication is 1.6 for data in FIG. 8A and 1.15 for data in FIG. 8B. That is, a tile is replicated in 1.6 data centers on average for data in FIG. 8A. A tile is replicated in 1.15 data centers on average for data in FIG. 8B. GFS (Google File System) replications for FIGS. 8A and 8B are both 1.5. This indicates a tile is replicated 1.5 times inside Google File Systems on average in both examples. An overall replication is about 2.4 for data in FIG. 8A and 1.73 for data in FIG. 8B. In one embodiment, panoramic image data at zoom level 2 provides a basic coverage for user requests. In FIG. 10, basic coverage DC redundancy values are 3 for both FIG. 8A and FIG. 8B. That is, panoramic image data at zoom level 2 are replicated at 3 data centers on average. If the data in FIG. 8A is fully replicated in three data centers, at least 15.75 MP (3.5 MP×1.5×3) in storage space are used. However, by replicating the data based on AUH contributions, about 8.4 MP (3.5 MP×2.4) in storage space is needed. Similarly, full replication in three data centers for the data in FIG. 8B requires at least 315 MP (70 MP×1.5×3) in storage space. An AUH-based replication for the data in FIG. 8B only required about 121.1 MP (70 MP×1.73) in storage space—a significant savings. Therefore, managing data storage capacity based on AUH contributions can reduce resource consumption while maintaining overall user happiness.

Example Computer Systems

Figure 11:
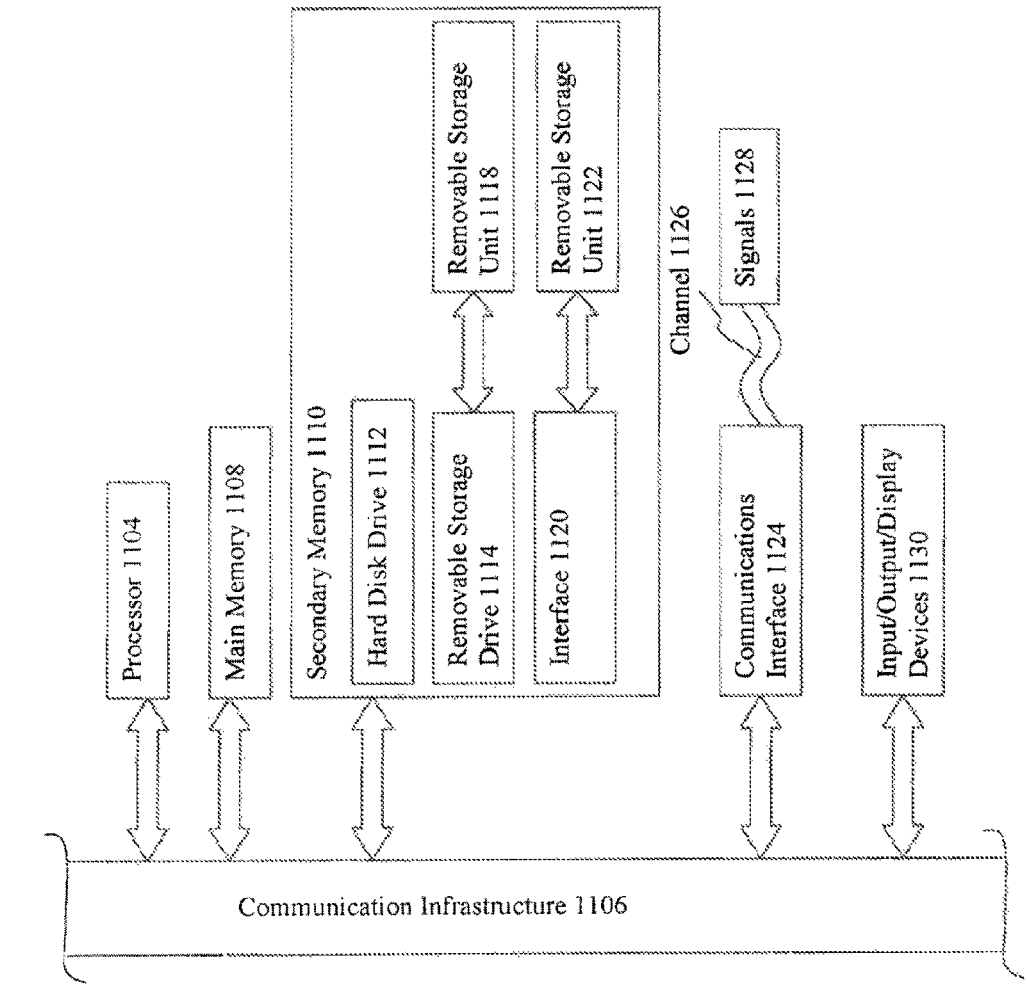
FIG. 11 is an exemplary computer system for managing storage capacity of multiresolutional data servers according to one embodiment of the present invention.

Embodiments of the present invention may be implemented using hardware, firmware, software or a combination thereof and may be implemented in a computer system or other processing system. In an embodiment, a computer program product may include program code that can execute on a computing device to carry out the functionality described herein. An example of a computing device, computer system 1100, is shown in FIG. 11. For example, in one embodiment, data replicator 140, including components AUH calculator 141 and resource allocator 142, can be implemented in system 1100.

The computer system 1100 includes one or more processors, such as processor 1104. The processor 1104 is connected to a communication infrastructure 1106 (such as a bus). Various software embodiments are described in terms of this example computer system. After reading this description, it will become apparent to a person skilled in the relevant art how to implement embodiments of the invention using other computer systems and/or computer architectures.

Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, memory card, etc. which is read by and written to by removable storage drive 1114. As will be appreciated, the removable storage unit 1118 includes a computer usable storage medium having stored therein computer software and/or data.

In alternative embodiments, secondary memory 1110 may include other similar means for allowing computer programs or other instructions to be loaded into computer system 1100. Such means may include, for example, a removable storage unit 1122 and an interface 1120. Examples of such may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communication interface 1124. Communication interface 1124 enables computer 1100 to communicate with external and/or remote devices. For example, communication interface 1124 allows software and data to be transferred between computer system 1100 and external devices. Communication interface 1124 also allows computer 1100 to communicate over communication networks, such as LANs, WANs, the Internet, etc. Communication interface 1124 may interface with remote sites or networks via w'red or wireless connections. Examples of communications interface 1124 may include a modem, a network interface (such as an Ethernet card), a communications port, a PCMCIA slot and card, etc. Computer 1100 receives data and/or computer program products via communication network 1124. Software and data transferred via communications interface 1124 are in the form of signals 1128 which may be electronic, electromagnetic, optical or other signals capable of being received by communications interface 1124. These signals 1128 are provided to communications interface 1124 via a communications path (i.e., channel) 1126. This channel 1126 carries signals 1128 and may be implemented using wire or cable, fiber optics, a phone line, a cellular phone link, an RE link or other communications channels.

In this document, the terms "computer program medium" and "computer usable medium" are used to generally refer to tangible media such as removable storage drive 1114 or a hard disk installed in hard disk drive 1112. These computer program products are tangible means for providing software to computer system 1100 exclusive of intangible signals alone.

Computer programs (also called computer control logic) are stored in main memory 1108 and/or secondary memory 1110. Computer programs may also be received via communications interface 1124. Such computer programs, when executed, enable the computer system 1100 to perform the features of the present invention as discussed herein. In particular, the computer programs, when executed, enable the processor 1104 to perform the features of embodiments of the present invention. Accordingly, such computer programs represent controllers of the computer system 1100.

In an embodiment where the invention is implemented using software, the software may be stored in a computer program product and loaded into computer system 1100 using removable storage drive 1114, hard disk drive 1112 or communications interface 1124. The control logic (software), when executed by the processor 1104, causes the processor 1104 to perform the functions of embodiments of the invention as described herein.

Computer 1100 also includes input/output/display devices 1132, such as monitors, keyboards, pointing devices, etc.

Embodiments can work with software, hardware, and operating system implementations other than those described herein. Any software, hardware, and operating system implementations suitable for performing the functions described herein can be used.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for managing resource storage for multi-resolution imagery data with zoom level in a distributed geographic information system having a plurality of data centers, comprising:
   selecting an image tile representing a portion of the multi-resolution imagery data at a zoom level;
   determining an aggregated user happiness contribution for the selected image tile based on one or more criteria including:
   popularity of the image tile,
   geographical information associated with the image tile,
   a point of interest of the image tile,
   an access pattern of the image tile,
   advertisement information associated with the image tile,
   a user annotation of the image tile, and
   a zoom level of the image tile;
   determining one or more resource storage parameters for the image tile based on the calculated aggregated user happiness contribution, wherein the resource storage parameters include one or more of the following:
   a number of copies to be replicated for the image tile,
   a number of data centers in the distributed geographic information system to store the copies of the image tile,
   a location of a data center where a copy of the image tile will be stored,
   a number of data severs in the data center where a copy of the image tile will be stored, and
   a compression algorithm for storing one or more copies of the image tile; and
   replicating and storing the image tile in one or more of the data centers in the distributed geographic information system based on the determined resource storage parameters.

2. A system for managing resource storage for multi-resolution imagery data with zoom level in a distributed geographic information system, comprising:
   a plurality of data centers in the distributed geographic information system;
   an image tile selector configured to select an image tile representing a portion of the multi-resolution imagery data at a zoom level;
   an aggregated user happiness contribution calculator configured to calculate an aggregated user happiness contribution for the selected image tile based on one or more criteria including:
   popularity of the image tile,
   geographical information associated with the image tile,
   a point of interest of the image tile,
   an access pattern of the image tile,
   advertisement information associated with the image tile,
   a user annotation of the image tile, and
   a zoom level of the image tile;
   a resource allocator configured to determine one or more resource storage parameters for the image tile based on the calculated aggregated user happiness contribution, wherein the resource storage parameters include one or more of the following:
   a number of copies to be replicated for the image tile,
   a number of data centers in the distributed geographic information system to store the copies of the image tile,
   a location of a data center where a copy of the image tile will be stored,
   a number of data severs in the data center where a copy of the image tile will be stored, and
   a compression algorithm for storing one or more copies of the image tile; and
   a data replicator configured to replicate and store the image tile in one or more of the data centers in the distributed geographic information system based on the determined resource storage parameters.

3. An article of manufacture including a non-transitory computer-readable storage medium having instructions stored thereon that, when executed by a computing device, cause the computing device to perform operations for managing resource storage for multi-resolution imagery data with zoom level in a distributed geographic information system, the operations comprising:
   selecting an image tile representing a portion of the multi-resolution imagery data at a zoom level;
   determining an aggregated user happiness contribution for the selected image tile based on one or more criteria including:
   popularity of the image tile,
   geographical information associated with the image tile,
   a point of interest of the image tile,
   an access pattern of the image tile,
   advertisement information associated with the image tile,
   a user annotation of the image tile, and
   a zoom level of the image tile,
   determining one or more resource storage parameters for the image tile based on the calculated aggregated user happiness contribution, wherein the resource storage parameters include one or more of the following:
   a number of copies to be replicated for the image tile,
   a number of data centers in the distributed geographic information system to store the copies of the image tile,
   a location of a data center where a copy of the image tile will be stored,
   a number of data severs in the data center where a copy of the image tile will be stored, and
   a compression algorithm for storing one or more copies of the image tile; and
   replicating and storing the image tile in one or more of the data centers in the distributed geographic information system based on the determined resource storage parameters.

* * * * *